Aug. 15, 1961     J. A. MURPHY     2,996,052
FUEL LINE HEATER
Filed April 14, 1960
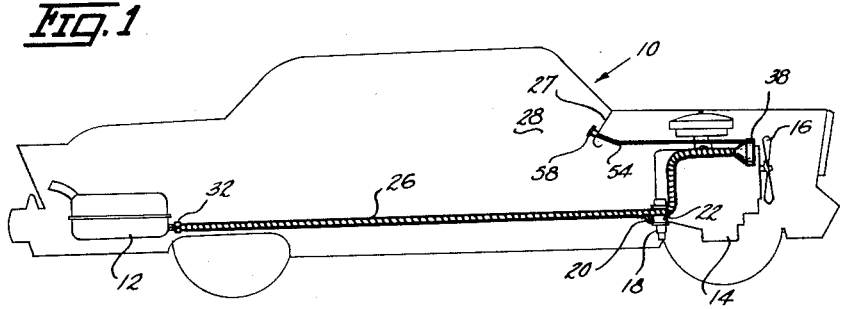
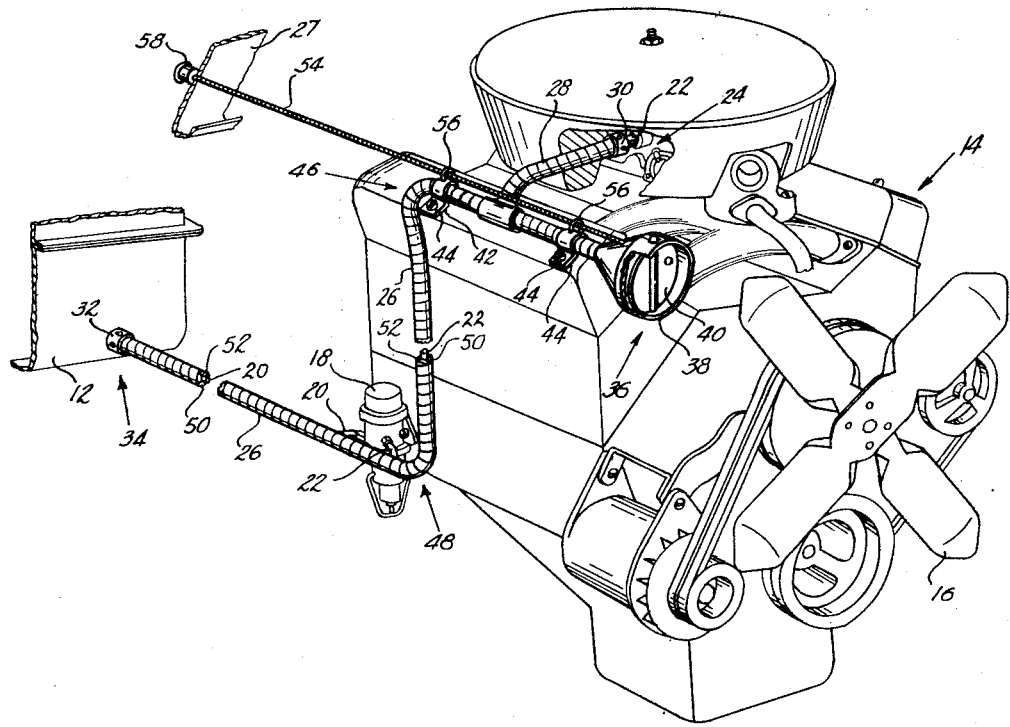
INVENTOR.
JAMES A. MURPHY
BY Morton S. Adler
ATTORNEY.

United States Patent Office 2,996,052
Patented Aug. 15, 1961

2,996,052
FUEL LINE HEATER
James A. Murphy, 3946 1st St., Des Moines, Iowa
Filed Apr. 14, 1960, Ser. No. 22,305
10 Claims. (Cl. 123—122)

This invention relates to motor vehicle fuel lines and has for its main object the provision of novel means for heating the fuel line to prevent any freezing of moisture that might be in the line.

Another object contemplated herein is to provide a gas or fuel line heater for a motor vehicle that utilizes heat generated by the engine.

A further object in a heater of the above class is to utilize the air flow created by the fan on the engine to distribute the heat from the engine to the fuel line, the fuel pump and the carburetor.

Still another object is to provide means for selectively regulating the distribution of heated air to the fuel line.

Further objects and the more obvious advantages of the invention will be mentioned or else appear plainly from the description which follows.

This invention consists of novel parts and combination of parts to be hereinafter described whereby the objects set forth are attained as pointed out in the claims, and illustrated in the accompanying drawings, in which:

FIG. 1 is a schematic side view of a motor vehicle illustrating this invention applied thereto, and FIG. 2 is an enlarged fragmetary perspective view of a motor vehicle engine and fuel tank showing this invention in operating position.

Referring to the drawings a motor vehicle is designated generally by the numeral 10 and for purposes of this invention includes a fuel tank 12 at the rear, an engine 14 at the front having a fan 16, a fuel pump 18, a fuel line 20 connected between tank 12 and pump 18, fuel line 22 connected between pump 18 and the carburetor designated generally at 24, and a dashboard 27 within the forward passenger compartment 28.

It is well known that moisture in fuel lines frequently freezes in some of the low spots during cold weather so as to completely block the flow of fuel and the primary objective of this invention is to supply heat from the engine 14 to the fuel lines 20 and 22, pump 18 and carburetor 24 to eliminate blockage from such cause. To accomplish this purpose, I have used a preferably flexible metal tubular housing 26 having a tubular branch 28 diverging near one end and terminating in an apertured fitting 30. A like fitting 32 is on the rearward end 34 of tubing 26 and the forward end 36 defines a flared air intake port 38 which is provided with a damper member 40. The forward portion of tubing 26 is mounted on engine 14, so as to absorb heat therefrom, and is secured thereto by one or more clips 42 attached to any convenient bolts 44 on the engine. At point 46, housing 26 extends downwardly to a point 48 near the fuel pump 18 and continues from there for attachment to the fuel tank 12 by fitting 32. Tube branch member 28 extends to the carburetor 24 and is attached thereto by fitting 30.

Fuel line 20 is encased within housing 26 intermediate tank 12 and pump 18 (FIG. 2), such line being withdrawn therefrom near the pump for connection thereto at the intake side, and line 22 at the outlet side of the pump enters tube 26 at a near point and continues in the tube 26, through branch 28 and is attached to the carburetor 24 in the usual manner. Tubes 26 and 28 are larger in diameter than the fuel lines 20 and 22 to provide an air flow channel 50 and may contain spider members 52 to hold the fuel lines in concentric relationship. Thus arranged, tubular housings 26 and 28 in effect form a heat distribution jacket for the fuel line from the gas tank 12 to the carburetor 24. The intake port 38 on housing 26 is disposed at the forward end of the engine 14 and located in the path of air flow created by the fan 16. Damper 40 is operated by a push-pull cable 54 which is trained through eyes 56 on clips 42 and mounted through the dashboard 27 where a knob 58 is attached for obvious reasons.

After only five or six revolutions of the engine as it is started, heat of progressively increasing intensity is absorbed by tube 26 and with damper 40 opened, air is blown by fan 16 into inlet 38 and through housings 26 and 28 to the air escape apertures in fittings 30 and 32. There is usually sufficient fuel in the carburetor assembly to run the engine for a short period even if the fuel line is blocked by frozen moisture and during this short period, my invention will have passed sufficient heat over the fuel lines 20 and 22 so as to have melted any such blockage. The heating of the fuel line 20 and 22 will of course transmit heat to the pump 18 and carburetor 24.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:

1. A fuel line heater for a motor vehicle having an engine with a fan, a carburetor associated with the engine, a fuel tank, a fuel pump and a fuel line extending from the tank to the pump and from the pump to the carburetor, said heater comprising a heat jacket enclosing said fuel line and connected to said fuel tank and said carburetor, a portion of said heat jacket disposed relative to said engine so as to absorb heat therefrom, and means to move air through said heat jacket.

2. A fuel line heater for a motor vehicle having an engine with a fan, a carburetor associated with the engine, a fuel tank, fuel pump and a fuel line extending from the tank to the pump and from the pump to the carburetor, said heater comprising a heat jacket enclosing said fuel line and connected to said fuel tank and said carburetor, a portion of said heat jacket disposed relative to said engine so as to absorb heat therefrom, and means to move air through said heat jacket; said means including an air intake port on said heater positioned in the path of air flow from said fan.

3. A device as defined in claim 2 including an openable and closable damper means in said intake port, and means to selectively control the open and closed position of said damper.

4. A fuel line heater for a motor vehicle having a passenger compartment, an engine with a fan, a carburetor associated with the engine, a fuel tank, fuel pump and a fuel line extending from the tank to the pump and from the pump to the carburetor, said heater comprising a heat jacket enclosing said fuel line, a portion of said heat jacket disposed relative to said engine so as to absorb heat therefrom, and means to move air through said heat jacket; said means including an air intake port on said heater positioned in the path of air flow from said fan, a damper in said intake port, said damper having an open and closed position, and control means operable from said passenger compartment and connected to said damper for selectively regulating its open and closed position.

5. A fuel line heater for a motor vehicle having an engine with a fan, a carburetor associated with the engine, a fuel tank, fuel pump and a fuel line extending from the tank to the pump and from the pump to the carburetor, said heater comprising a flexible tubular heat jacket secured in part to said engine so as to absorb heat therefrom and extending in a forward direction to a point closely adjacent said fan on the engine side and extending in the other direction so as to pass closely adjacent said pump and extending to and connected with said tank, a tubular branch member extending from said jacket at its secured portion to said carburetor, a portion of said fuel line encased in said jacket from said tank to a point adjacent said pump where it leaves said jacket for attachment to one side of the pump, said fuel line connected at the other side of said pump entering said jacket at an adjacent point so as to be encased therein and extend in and through said branch member to said carburetor, and means to move air through said jacket and branch member.

6. A device as defined in claim 5 including respective apertured fittings for connecting said jacket to said tank and for connecting said branch member to said carburetor whereby air moving through said jacket and branch member is afforded a means of escape therefrom.

7. A fuel line heater for a motor vehicle having an engine with a fan, a carburetor associated with the engine, a fuel tank, fuel pump and a fuel line extending from the tank to the pump and from the pump to the carburetor, said heater comprising a flexible tubular heat jacket secured in part to said engine so as to absorb heat therefrom and extending in a forward direction to a point closely adjacent said fan on the engine side and extending in the other direction so as to pass closely adjacent said pump and extending to and connected with said tank, a tubular branch member extending from said jacket at its secured portion to said carburetor, a portion of said fuel line encased in said jacket from said tank to a point adjacent said pump where it leaves said jacket for attachment to one side of the pump, said fuel line connected at the other side of said pump entering said jacket at an adjacent point so as to be encased therein and extend in and through said branch member to said carburetor, and means to move air through said jacket and branch member; said means including an air intake port on said heater positioned in the path of air flow from said fan.

8. A fuel line heater for a motor vehicle having an engine with a fan, a carburetor associated with the engine, a fuel tank, fuel pump and a fuel line extending from the tank to the pump and from the pump to the carburetor, said heater comprising a heat jacket enclosing said fuel line, a portion of said heat jacket disposed relative to said engine so as to absorb heat therefrom, means to move air through said heat jacket, and said jacket provided with air escape means adjacent said tank and said carburetor.

9. A fuel line heater for a motor vehicle having an engine with a fan, a carburetor associated with the engine, a fuel tank, fuel pump and a fuel line extending from the tank to the pump and from the pump to the carburetor, said heater comprising a heat jacket enclosing said fuel line, a portion of said heat jacket disposed relative to said engine so as to absorb heat therefrom, and means to move air through said heat jacket; said means including an air intake port on said heater positioned in the path of air flow from said fan, and said jacket provided with air escape means adjacent said tank and said carburetor.

10. A fuel line heater for a motor vehicle having an engine with a fan, a carburetor associated with the engine, a fuel tank, fuel pump and a fuel line extending from the tank to the pump and from the pump to the carburetor, said heater comprising a heat jacket enclosing said fuel line and connected to said fuel tank and said carburetor by respective apertured fittings, a portion of said heat jacket disposed relative to said engine so as to absorb heat therefrom, and means to move air through said heat jacket.

References Cited in the file of this patent
UNITED STATES PATENTS 2,033,575     Hochreiter et al. _____ Mar. 10, 1936